US010051456B2

(12) United States Patent
You et al.

(10) Patent No.: US 10,051,456 B2
(45) Date of Patent: Aug. 14, 2018

(54) NEAR FIELD COMMUNICATION DISCOVERY METHOD, APPARATUS AND SYSTEM

(71) Applicant: ZTE CORPORATION, Shenzhen, Guangdong Province (CN)

(72) Inventors: Shilin You, Shenzhen (CN); Jiyan Cai, Shenzhen (CN); Zaifeng Zong, Shenzhen (CN); Shuang Liang, Shenzhen (CN); Zhaoji Lin, Shenzhen (CN); Jin Peng, Shenzhen (CN); Yang Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/503,721

(22) PCT Filed: Nov. 12, 2014

(86) PCT No.: PCT/CN2014/090956
§ 371 (c)(1),
(2) Date: Jul. 4, 2017

(87) PCT Pub. No.: WO2016/023282
PCT Pub. Date: Feb. 18, 2016

(65) Prior Publication Data
US 2017/0295484 A1 Oct. 12, 2017

(30) Foreign Application Priority Data
Aug. 15, 2014 (CN) .......................... 2014 1 0404016

(51) Int. Cl.
H04W 4/00 (2018.01)
H04W 8/00 (2009.01)
(Continued)

(52) U.S. Cl.
CPC ........... *H04W 8/005* (2013.01); *H04W 4/008* (2013.01); *H04W 4/80* (2018.02); *H04W 48/10* (2013.01)

(58) Field of Classification Search
CPC ..................................................... H04W 8/005
(Continued)

(56) References Cited

U.S. PATENT DOCUMENTS

2014/0057667 A1 2/2014 Blankenship et al.
2014/0130137 A1 5/2014 Baek et al.

FOREIGN PATENT DOCUMENTS

CN 102547984 A 7/2012
CN 103037448 A 4/2013

OTHER PUBLICATIONS

3GPP, Consideration of D2D discovery procedure and message, 3GPP TSG-RAN WG RAN3#84 San Francisco, USA, Nov. 7-11, 2013, R2-134333, X0P50737057.
(Continued)

*Primary Examiner* — Joel Ajayi
(74) *Attorney, Agent, or Firm* — Ling Wu; Stephen Yang; Ling and Yang Intellectual Property

(57) ABSTRACT

The present disclosure discloses a near field communication discovery method, apparatus and system. Herein, the method includes: a discovery terminal receiving discovery information allocated by a network side to a discovered terminal, herein the discovery information includes a discovery identity, and the discovery information is transmitted by the network side to the discovered terminal; the discovery terminal performing paging or broadcasting using the discovery identity; and the discovery terminal receiving a response returned by the discovered terminal to determine that the discovered terminal is discovered.

14 Claims, 10 Drawing Sheets

(51) Int. Cl.
*H04W 48/10* (2009.01)
*H04W 4/80* (2018.01)

(58) Field of Classification Search
USPC .......................................................... 455/434
See application file for complete search history.

(56) References Cited

OTHER PUBLICATIONS

3GPP, Solution for ProSe discovery, SA WG2 Meeting #97, Busan, South Korea, May 27-31, 2013, S2-132285, XP050709422.
3GPP, Update of solution D13 to support model B, SA WG2 Meeting #101, Taipei, Taiwan, Jan. 20-24, 2014, S2-140274, XP050744594.

NEAR FIELD COMMUNICATION DISCOVERY METHOD, APPARATUS AND SYSTEM

TECHNICAL FIELD

The present disclosure relates to the field of communications, and in particular, to a near field communication discovery method, apparatus and system.

BACKGROUND

In order to maintain competitiveness of the 3rd generation mobile communication system in the field of communications, provide users with faster and more personalized mobile communication services with a less delay, and reduce operators' operating costs, the 3rd Generation Partnership Project (3GPP) standard working group is devoting to the research on an Evolved Packet System (EPS). The whole EPS includes an Evolved Universal Terrestrial Radio Access Network (E-UTRAN) and an Evolved Packet Core Networking (EPC), herein the EPC includes a Home Subscriber Server (HSS), a Mobility Management Entity (MME), a Serving GPRS Support Node (SGSN), a Policy and Charging Rule Function (PCRF), a Serving Gateway (S-GW), a PDN Gateway (P-GW) and a Packet Data Network (PDN).

When two User Equipments (UEs) communicate with each other through an EPS, the two UEs need to establish a bearer with the EPS respectively. However, considering the rapid development of the UEs and various mobile Internet services, it is desired to discover and communicate with neighboring UEs for a lot of services, thus creating Device to Device (D2D) services. In addition, the D2D services are also called Proximity-based Services (ProSe). In the D2D services, when two UEs are located close to each other, they can communicate directly and their connected data paths cannot be rounded back to the core network. Thus, on the one hand, the roundabout of data routing can be reduced, and on the other hand, data load of the network can also be reduced.

Currently, the commonly used D2D services include a D2D discovery service. Architecture of D2D discovery service communication is shown in FIG. 1. Two UEs for D2D access can only access an EPC through an E-UTRAN. Both of the UEs may belong to a Public Land Mobile Network (PLMN), or belong to two PLMNs respectively. For a UE, the PLMNs may be divided as a Home PLMN (HPLMN) and a Visited PLMN (VPLMN) when the UE accesses from another PLMN. For a PLMN for an area in which the UE is currently located, it may be collectively referred to as a Local PLMN (LPLMN) regardless of whether the local PLMN is an HPLMN or a VPLMN. In order to realize the D2D discovery service, not only the EPS is deployed on the operator side, but also a ProSe application server which deploys the D2D discovery service is further included. The ProSe application server can be provided by a service provider which operates the D2D service, and can also be provided by a network operator which operates the EPS. A ProSe function is also deployed in a different PLMN.

In the architecture of the D2D discovery service communication, as the UE provides a related ProSe Application (APP), an interface between it and the ProSe application server is a PC1 interface, which provides a related authentication function. An interface between UEs is PC5, which is used for mutual direct discovery and communication between the UEs, and an interface between the UE and the ProSe function is PC3 which is used for discovery authentication through the network. An interface between the ProSe function and an existing EPC is PC4, which includes a user plane interface with the P-GW and a control plane interface with the HSS for discovery authentication of the D2D discovery service. An interface between the ProSe function and the ProSe application server is PC2, which is used for application realization of the D2D discovery service. There are PC6 and PC7 interfaces between ProSe functions respectively, which are used for two cases where the UE is roaming and does not roam respectively. When the UE is roaming, the PC7 interface is used, and when the UE does not roam, the PC6 interface is used. The two interfaces are used for performing information interaction between two ProSe functions when the UE performs D2D discovery service.

In the D2D discovery service, it is divided into an open discovery service and a restrictive discovery service. The open discovery service means that when a user broadcasts a discovery code, any UE can receive the discovery code and discover the user without restriction. The current open discovery service is divided into three processes. In the present disclosure, for convenience of description, UE-A is an announce UE and its corresponding home ProSe function is ProSe Function A, which is referred to as PF-A for short, and UE-B is a monitor UE, and its corresponding home ProSe function is ProSe Function B, which is referred to as PF-B for short. Therefore, the open discovery service is divided into an announce process of the discovered UE-A, and a monitor process of the discovery UE-B. The two processes are processes of initiating a discovery request to corresponding home PFs to acquire allocation of radio resources. Then, the UE-A broadcasts a discovery code, and after receiving the discovery code, the UE-B performs matching for PF-A, which is a matching process. However, for the restrictive discovery service, in the existing technology, the above three processes are still used, and the UE-A will occupy air interface resources at any time to broadcast a discovery code to seek for discovery of the UE-B or other UEs. This will result in a waste of radio resources, which is disadvantageous for the development of the restrictive service.

There is no effective solution to the problem of a waste of radio resources in the restrictive discovery service in the existing technology.

SUMMARY

The embodiments of the present disclosure provide a near field communication discovery method, apparatus and system, to at least solve the problem of a waste of radio resources in the restrictive discovery service in the existing technology.

In an aspect according to an embodiment of the present disclosure, there is provided a near field communication discovery method, including: a discovery terminal receiving discovery information allocated by a network side to a discovered terminal, herein the discovery information includes a discovery identity, and the discovery information is transmitted by the network side to the discovered terminal; the discovery terminal performing paging or broadcasting using the discovery identity; and the discovery terminal receiving a response returned by the discovered terminal to determine that the discovered terminal is discovered.

In an exemplary embodiment, a discovery terminal receiving discovery information allocated by a network side to a discovered terminal includes: the discovery terminal receiving the discovery information allocated by a Proximity-based Services (ProSe) Function (PF) to which the discovery terminal belongs to the discovered terminal.

In an exemplary embodiment, the discovery identity includes the following information: an operator identity corresponding to the PF to which the discovery terminal belongs, an identity of the PF to which the discovery terminal belongs, and a temporary identity allocated by the PF to which the discovery terminal belongs to a service identity corresponding to the discovered terminal.

In an exemplary embodiment, a discovery terminal receiving discovery information allocated by a network side to a discovered terminal includes: the discovery terminal receiving the discovery information allocated by a PF to which the discovered terminal belongs to the discovered terminal.

In an exemplary embodiment, the discovery identity includes the following information: an operator identity corresponding to the PF to which the discovered terminal belongs, an identity of the PF to which the discovered terminal belongs, and a temporary identity allocated by the PF to which the discovered terminal belongs to a service identity corresponding to the discovered terminal.

In an exemplary embodiment, a discovery terminal receiving discovery information allocated by a network side to a discovered terminal includes: the discovery terminal receiving the discovery information allocated by an application server to the discovered terminal.

In an exemplary embodiment, the discovery identity includes the following information: an identity of the application server, and a temporary identity allocated by the application server to a service identity corresponding to the discovered terminal.

In an exemplary embodiment, the discovery information further includes a validity period of the discovery identity.

In an exemplary embodiment, the discovery information further includes a service identity of the discovered terminal, which indicates that the discovery terminal can discover the discovered terminal.

In another aspect according to an embodiment of the present disclosure, there is further provided a near field communication discovery method, including: a discovered terminal receiving discovery information allocated by a network side to the discovered terminal, herein the discovery information includes a discovery identity; the discovered terminal receiving a page message or a broadcast message transmitted by a discovery terminal; and the discovered terminal determining that a discovery identity carried in the page message or the broadcast message is the same as the discovery identity received from the network side, and returning a page or broadcast response message to the discovery terminal to indicate that the discovery terminal discovers the discovered terminal.

In an exemplary embodiment, a discovered terminal receiving discovery information allocated by a network side to the discovered terminal includes: the discovered terminal receiving the discovery information allocated by a Proximity-based Services (ProSe) Function (PF) to which the discovery terminal belongs to the discovered terminal.

In an exemplary embodiment, the discovery identity includes the following information: an operator identity corresponding to the PF to which the discovery terminal belongs, an identity of the PF to which the discovery terminal belongs, and a temporary identity allocated by the PF to which the discovery terminal belongs to a service identity corresponding to the discovered terminal.

In an exemplary embodiment, a discovered terminal receiving discovery information allocated by a network side to the discovered terminal includes: the discovered terminal receiving the discovery information allocated by a PF to which the discovered terminal belongs to the discovered terminal.

In an exemplary embodiment, the discovery identity includes the following information: an operator identity corresponding to the PF to which the discovered terminal belongs, an identity of the PF to which the discovered terminal belongs, and a temporary identity allocated by the PF to which the discovered terminal belongs to a service identity corresponding to the discovered terminal.

In an exemplary embodiment, a discovered terminal receiving discovery information allocated by a network side to the discovered terminal includes: the discovered terminal receiving the discovery information allocated by an application server to the discovered terminal.

In an exemplary embodiment, the discovery identity includes the following information: an identity of the application server, and a temporary identity allocated by the application server to a service identity corresponding to the discovered terminal.

In an exemplary embodiment, the discovery information further includes a validity period of the discovery identity.

In an exemplary embodiment, the discovery information further includes a service identity of the discovered terminal, which indicates that the discovery terminal can discover the discovered terminal.

In another aspect according to an embodiment of the present disclosure, there is provided a near field communication discovery processing method, including: receiving a discovery request message transmitted by a discovered terminal; allocating discovery information to the discovered terminal, herein the discovery information includes a discovery identity; and transmitting the discovery information to a discovery terminal and the discovered terminal respectively, to indicate the discovery terminal to discover the discovered terminal using the discovery identity.

In an exemplary embodiment, before transmitting the discovery information to a discovery terminal and the discovered terminal respectively, the method further includes: authenticating the discovered terminal and a friend list carried in the discovery request message, herein the friend list at least includes the discovery terminal; and determining that the discovered terminal and the discovery terminal are located in the same position area.

In an exemplary embodiment, the discovery information further includes a validity period of the discovery identity.

In an exemplary embodiment, the discovery information further includes a service identity of the discovered terminal which indicates that the discovery terminal can discover the discovered terminal.

In another aspect according to an embodiment of the present disclosure, there is provided a near field communication discovery apparatus, including: a first reception module, arranged to receive discovery information allocated to a discovered terminal which is transmitted by a network side to a discovery terminal, herein the discovery information includes a discovery identity, and the discovery information is transmitted by the network side to the discovered terminal; a discovery module, arranged to perform paging or broadcasting using the discovery identity; and a second reception module arranged to receive a response returned by the discovered terminal to determine that the discovered terminal is discovered.

In another aspect according to an embodiment of the present disclosure, there is provided a near field communication discovery apparatus, including: a first reception module arranged to receive discovery information allocated to a discovered terminal which is transmitted by a network side to the discovered terminal, herein the discovery information includes a discovery identity; a second reception module arranged to receive a page message or a broadcast message transmitted by a discovery terminal; a determination module arranged to determine that a discovery identity carried in the page message or the broadcast message is the same as the discovery identity received from the network side; and a transmission module arranged to return a page or broadcast response message to the discovery terminal to indicate that the discovery terminal discovers the discovered terminal.

In another aspect according to an embodiment of the present disclosure, there is provided a near field communication discovery processing apparatus, including: a reception module arranged to receive a discovery request message transmitted by a discovered terminal; an allocation module arranged to allocate discovery information to the discovered terminal, herein the discovery information includes a discovery identity; and a transmission module arranged to transmit the discovery information to a discovery terminal and the discovered terminal respectively, to indicate the discovery terminal to discover the discovered terminal using the discovery identity.

In an exemplary embodiment, the apparatus further includes: an authentication module, arranged to authenticate the discovered terminal and a friend list carried in the discovery request message, herein the friend list at least includes the discovery terminal; and a determination module arranged to determine that the discovered terminal and the discovery terminal are located in a same position area.

In another aspect according to an embodiment of the present disclosure, there is provided a near field communication discovery system, including: a network side including the near field communication discovery processing apparatus described above; a discovery terminal, including the near field communication discovery apparatus described above; and a discovered terminal, including the near field communication discovery apparatus described above.

With the present disclosure, the discovery terminal performs discovery using the discovery identity allocated by the network side to the discovered terminal. This avoids the problem of a waste of radio resources due to occupation of air interface resources by the discovery terminal for broadcasting the discovery code, thereby saving the radio resources, which is advantageous for the development of the restrictive discovery service.

BRIEF DESCRIPTION OF DRAWINGS

The accompanying drawings described here are used to provide a further understanding of the present disclosure and form a part of the present application. The illustrative embodiments of the present disclosure and description thereof are used to explain the present disclosure, and do not constitute an improper definition of the present disclosure. In the accompanying drawings.

DETAILED DESCRIPTION

The present disclosure will be described in detail below with reference to accompanying drawings in combination of embodiments. It should be illustrated that, the embodiments in the present application and the features in the embodiments can be combined with each other without conflict.

In order to solve the problem of a waste of radio resources in the existing technology, the embodiments of the present disclosure provide an improved restrictive discovery service scheme to facilitate the development of restrictive discovery services in near field services.

Figure 1:
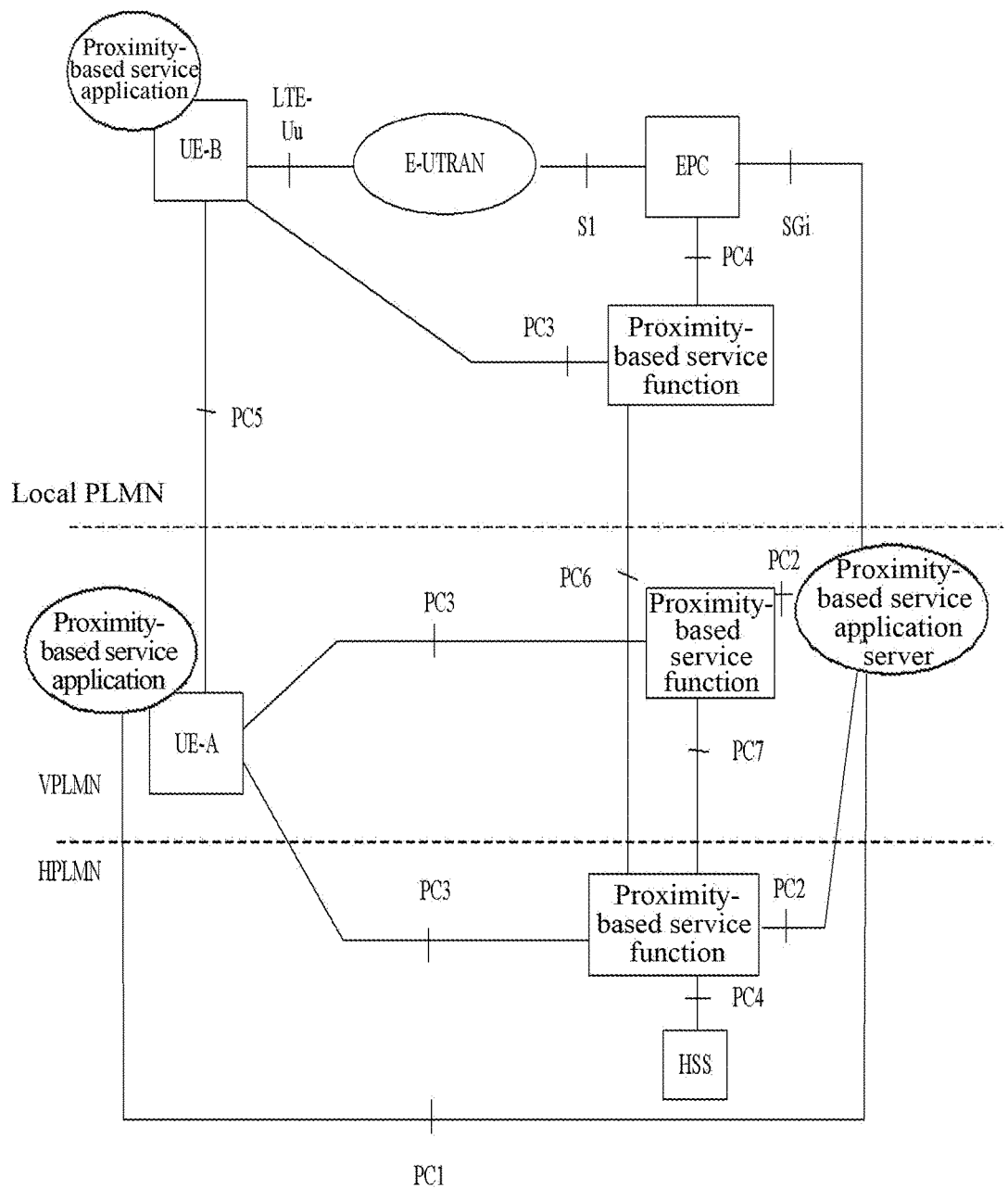
FIG. 1 is an architecture diagram of D2D discovery service communication in the existing technology.
Figure 2:
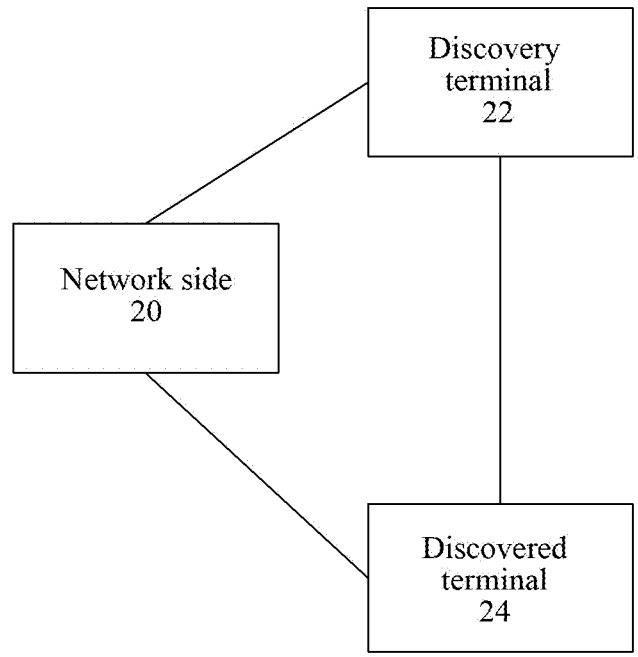
FIG. 2 is a structural diagram of a near field communication discovery system according to an embodiment of the present disclosure.

FIG. 2 is a structural diagram of a near field communication discovery system according to an embodiment of the present disclosure. As shown in FIG. 2, the system primarily includes a network side 20, a discovery terminal 22 and a discovered terminal 24. In the embodiment of the present disclosure, the network side 20 allocates a discovery identity (which may also be called a discovery code) to the discovered terminal 24 (UE-B), and issues it to the discovery terminal 22 (UE-A) and the discovered terminal 24 (UE-B) respectively, the UE-A 22 performs paging or broadcasting using the discovery code, UE-B 24 makes a response to the UE-A 22 after receiving the discovery identity, and the UE-A 22 discovers the UE-B 24.

In a specific implementation process, there are three manners for the network side to allocate the discovery code, which are allocation through a PF-A to which the discovery terminal 22 belongs, allocation through a PF-B to which the discovered terminal 24 belongs, and allocation through an application server. Details can be known with reference to the following description of the embodiments.

In an alternative embodiment of the present disclosure, the network side 20 may include a near field communication discovery processing apparatus.

Figure 3:
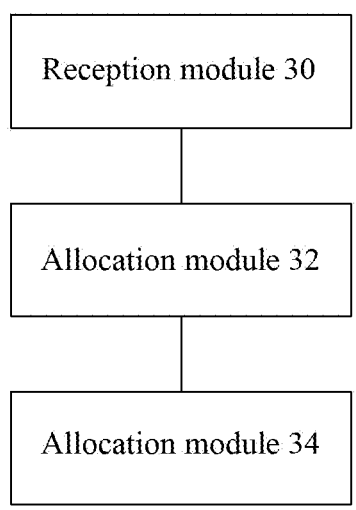
FIG. 3 is a structural diagram of a near field communication discovery processing apparatus according to an embodiment of the present disclosure.

FIG. 3 is a structural diagram of a near field communication discovery processing apparatus according to an embodiment of the present disclosure. As shown in FIG. 3, the apparatus primarily includes a reception module 30 arranged to receive a discovery request message transmitted by a discovered terminal; an allocation module 32 arranged to allocate discovery information to the discovered terminal, herein the discovery information includes a discovery identity; and a transmission module 34 arranged to transmit the discovery information to a discovery terminal and the discovered terminal respectively, to indicate the discovery terminal to discover the discovered terminal using the discovery identity.

In an alternative implementation according to an embodiment of the present disclosure, the apparatus may further include: an authentication module, arranged to authenticate the discovered terminal and a friend list carried in the discovery request message, herein the friend list at least includes the discovery terminal; and a determination module arranged to determine that the discovered terminal and the discovery terminal are located in the same position area.

In an embodiment of the present disclosure, the near field communication discovery processing apparatus generates a discovery identity for a discovered terminal (UE-B), herein the discovery identity may include an identity of the near field communication discovery processing apparatus and a temporary identity allocated to the UE, and at the same time, a discovery identity generation unit notifies a discovery terminal (UE-A) to generate a discovery identity for the UE-B which is used by the UE-A to perform paging or broadcasting for the UE-B, i.e., the UE-A discovers the UE-B. Herein, the near field communication discovery processing apparatus may be a PF-A to which the UE-A belongs or a PF-B to which the UE-B belongs, or may also be an application server.

In an alternative embodiment of the present disclosure, the discovery terminal 22 may include a first near field communication discovery apparatus.

Figure 4:
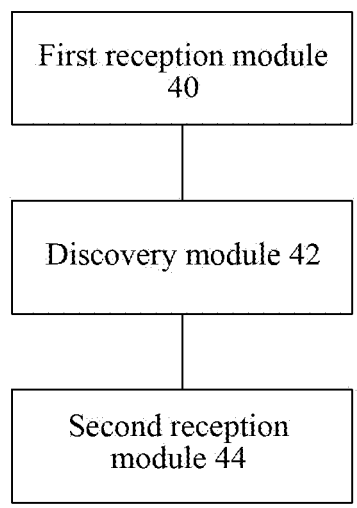
FIG. 4 is a structural diagram of a first near field communication discovery apparatus according to an embodiment of the present disclosure.

FIG. 4 is a structural diagram of a first near field communication discovery apparatus according to an embodiment of the present disclosure. As shown in FIG. 4, the apparatus primarily includes a first reception module 40, arranged to receive discovery information allocated to a discovered terminal which is transmitted by a network side to a discovery terminal, herein the discovery information includes a discovery identity, and the discovery information is transmitted by the network side to the discovered terminal; a discovery module 42, arranged to perform paging or broadcasting using the discovery identity; and a second reception module 44 arranged to receive a response returned by the discovered terminal to determine that the discovered terminal is discovered.

In an alternative embodiment of the present disclosure, the discovered terminal 24 may include a second near field communication discovery apparatus.

Figure 5:
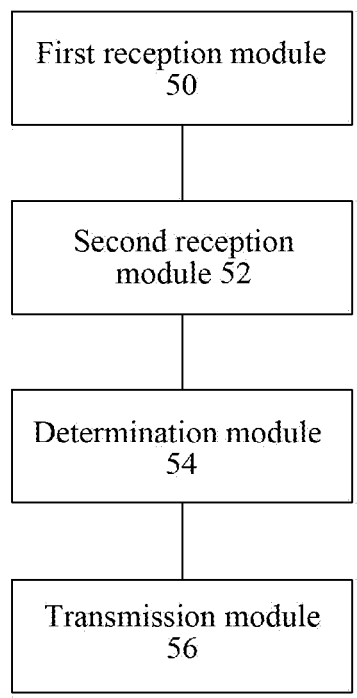
FIG. 5 is a structural diagram of a second near field communication discovery apparatus according to an embodiment of the present disclosure.

FIG. 5 is a structural diagram of a second near field communication discovery apparatus according to an embodiment of the present disclosure. As shown in FIG. 5, the apparatus primarily includes a first reception module 50 arranged to receive discovery information allocated to a discovered terminal which is transmitted by a network side to the discovered terminal, herein the discovery information includes a discovery identity; a second reception module 52 arranged to receive a page message or a broadcast message transmitted by a discovery terminal; a determination module 54 arranged to determine that a discovery identity carried in the page message or the broadcast message is the same as the discovery identity received from the network side; and a transmission module 56 arranged to return a page or broadcast response message to the discovery terminal to indicate that the discovery terminal discovers the discovered terminal.

In a specific implementation process, the network side 20 may include a discovery identity generation unit through which the discovery identity is generated and issued.

Figure 6:
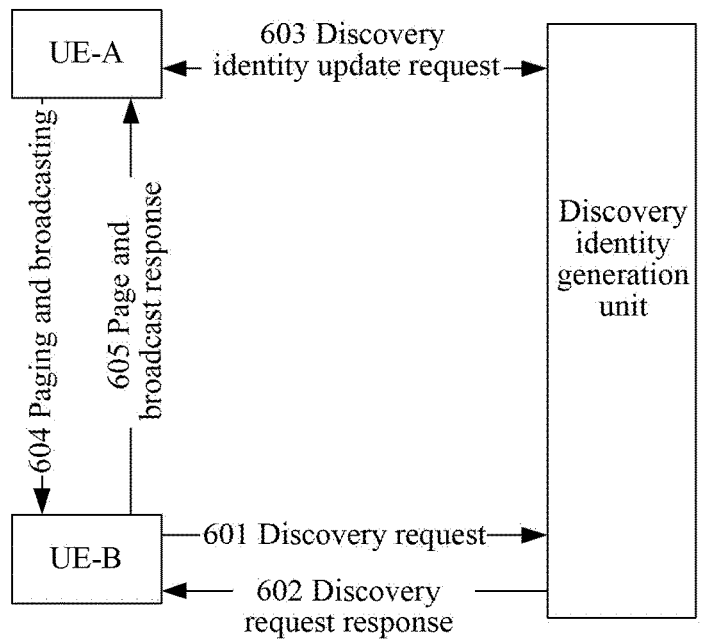
FIG. 6 is a basic structural diagram of a system for a restrictive discovery method according to an alternative embodiment of the present disclosure.

FIG. 6 is a basic structural diagram of a system for a restrictive discovery method according to an alternative embodiment of the present disclosure. As shown in FIG. 6, the UE-B transmits a discovery request to a discovery identity generation unit 601, and the discovery identity generation unit transmits a discovery request response message back to the UE-B 602, the message carries a discovery identity allocated to the UE-B, which includes an identity of the discovery identity generation unit and a temporary identity allocated to the UE, and at the same time, the discovery identity generation unit transmits a discovery identity update to the UE-A 603, the message carries the discovery identity allocated to the UE-B, the UE-A performs paging and broadcasting for the UE-B 604, the message carries the discovery identity, and the UE-B responds to the UE-A with a page and broadcast response 605, i.e., the UE-A discovers the UE-B.

According to an embodiment of the present disclosure, there is provided a near field communication discovery method. This method can be realized by the above-described first near field communication discovery apparatus and system.

Figure 7:
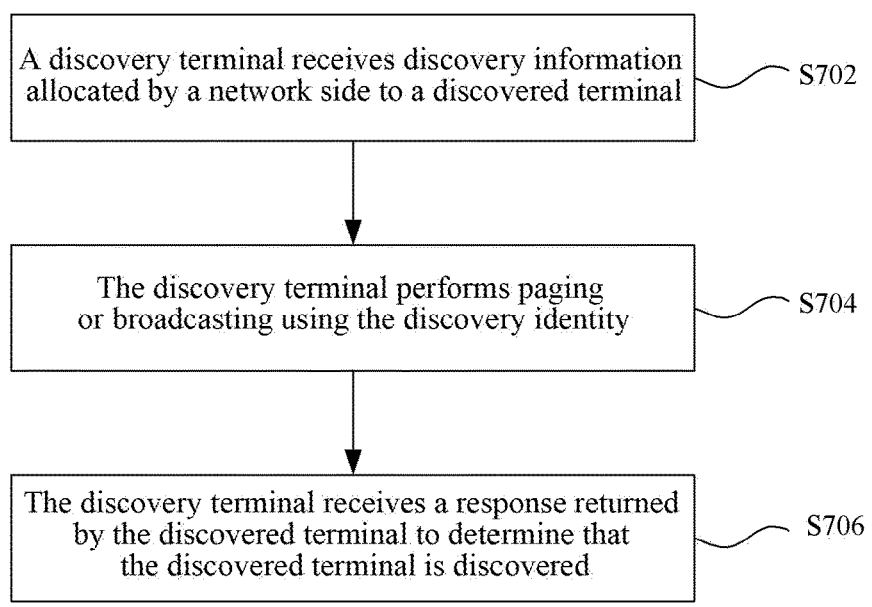
FIG. 7 is a flowchart of a first near field communication discovery method according to an embodiment of the present disclosure.

FIG. 7 is a flowchart of a near field communication discovery method according to an embodiment of the present disclosure. As shown in FIG. 7, the method primarily includes the following steps S702-S706.

In step S702, a discovery terminal receives discovery information allocated by a network side to a discovered terminal, herein the discovery information includes a discovery identity, and the discovery information is transmitted by the network side to the discovered terminal.

In step S704, the discovery terminal performs paging or broadcasting using the discovery identity.

In step S706, the discovery terminal receives a response returned by the discovered terminal to determine that the discovered terminal is discovered.

In an alternative implementation according to an embodiment of the present disclosure, a discovery terminal receiving discovery information allocated by a network side to a discovered terminal may include one of the followings:

(1) the discovery terminal receives the discovery information allocated by a Proximity-based Services (ProSe) Function (PF) to which the discovery terminal belongs to the discovered terminal. Alternatively, in the implementation, information which constitutes the discovery identity may include: an operator identity corresponding to the PF to which the discovery terminal belongs, an identity of the PF to which the discovery terminal belongs, and a temporary identity allocated by the PF to which the discovery terminal belongs to a service identity corresponding to the discovered terminal.

(2) the discovery terminal receives the discovery information allocated by a PF to which the discovered terminal belongs to the discovered terminal. Alternatively, in the implementation, information which constitutes the discovery identity may include: an operator identity corresponding to the PF to which the discovered terminal belongs, an identity of the PF to which the discovered terminal belongs, and a temporary identity allocated by the PF to which the discovered terminal belongs to a service identity corresponding to the discovered terminal.

(3) the discovery terminal receives the discovery information allocated by an application server to the discovered terminal. Alternatively, in the implementation, information which constitutes the discovery identity may include: an identity of the application server, and a temporary identity allocated by the application server to a service identity corresponding to the discovered terminal.

In an alternative implementation according to an embodiment of the present disclosure, the discovery information may further include a validity period of the discovery identity. Then, in step S704, the discovery terminal initiates paging or broadcasting within the validity period.

In an alternative implementation according to an embodiment of the present disclosure, the discovery information further includes a service identity of the discovered terminal, which indicates that the discovery terminal can discover the discovered terminal.

According to an embodiment of the present disclosure, there is further provided a second near field communication discovery method. The method may be realized by the above-described second near field communication discovery apparatus and system.

Figure 8:
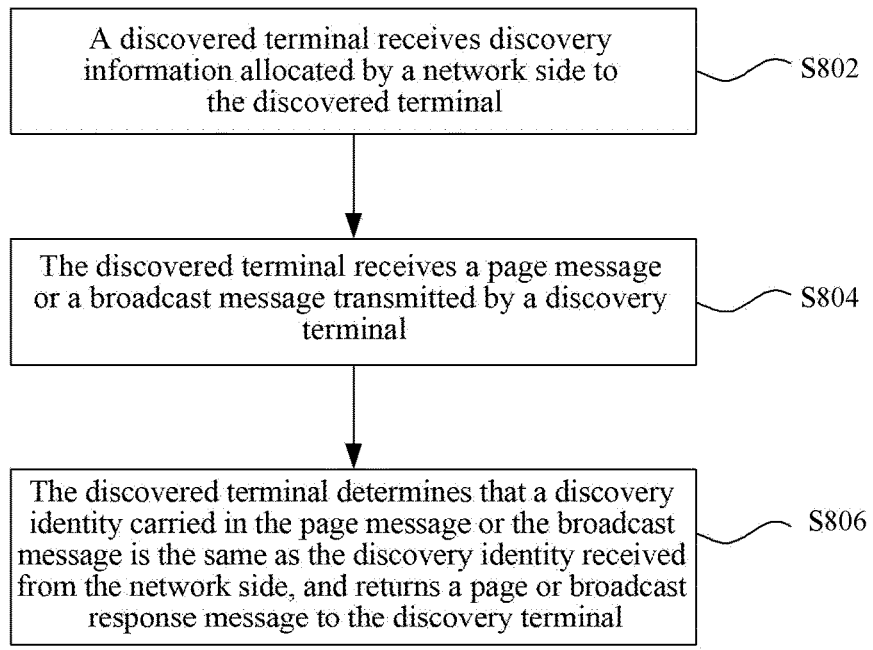
FIG. 8 is a flowchart of a second near field communication discovery method according to an embodiment of the present disclosure.

FIG. 8 is a flowchart of a second near field communication discovery method according to an embodiment of the present disclosure. As shown in FIG. 8, the method primarily includes the following steps S802-S806.

In step S802, a discovered terminal receives discovery information allocated by a network side to the discovered terminal, herein the discovery information includes a discovery identity.

In step S804, the discovered terminal receives a page message or a broadcast message transmitted by a discovery terminal.

In step S806, the discovered terminal determines that a discovery identity carried in the page message or the broadcast message is the same as the discovery identity received from the network side, and returns a page or broadcast response message to the discovery terminal to indicate that the discovery terminal discovers the discovered terminal.

In an alternative implementation according to an embodiment of the present disclosure, a discovered terminal receiving discovery information allocated by a network side to the discovered terminal may include one of the followings:

(1) the discovered terminal receives the discovery information allocated by a Proximity-based Services (ProSe) Function (PF) to which the discovery terminal belongs to the discovered terminal. Alternatively, in the implementation, information which constitutes the discovery identity may include: an operator identity corresponding to the PF to which the discovery terminal belongs, an identity of the PF to which the discovery terminal belongs, and a temporary identity allocated by the PF to which the discovery terminal belongs to a service identity corresponding to the discovered terminal.

(2) the discovered terminal receives the discovery information allocated by a PF to which the discovered terminal belongs to the discovered terminal. Alternatively, in the implementation, information which constitutes the discovery identity may include: an operator identity corresponding to the PF to which the discovered terminal belongs, an identity of the PF to which the discovered terminal belongs, and a temporary identity allocated by the PF to which the discovered terminal belongs to a service identity corresponding to the discovered terminal.

(3) the discovered terminal receives the discovery information allocated by an application server to the discovered terminal. Alternatively, in the implementation, information which constitutes the discovery identity may include: an identity of the application server, and a temporary identity allocated by the application server to a service identity corresponding to the discovered terminal.

In an alternative implementation according to an embodiment of the present disclosure, the discovery information may further include a validity period of the discovery identity. Then, in step S806, the discovered terminal further judges whether the discovery terminal initiates paging or broadcasting within the validity period.

In an alternative implementation according to an embodiment of the present disclosure, the discovery information further includes a service identity of the discovered terminal, which indicates that the discovery terminal can discover the discovered terminal.

According to an embodiment of the present disclosure, there is further provided a near field communication discovery processing method. The method may be realized by the above-described near field communication discovery processing apparatus and system.

Figure 9:
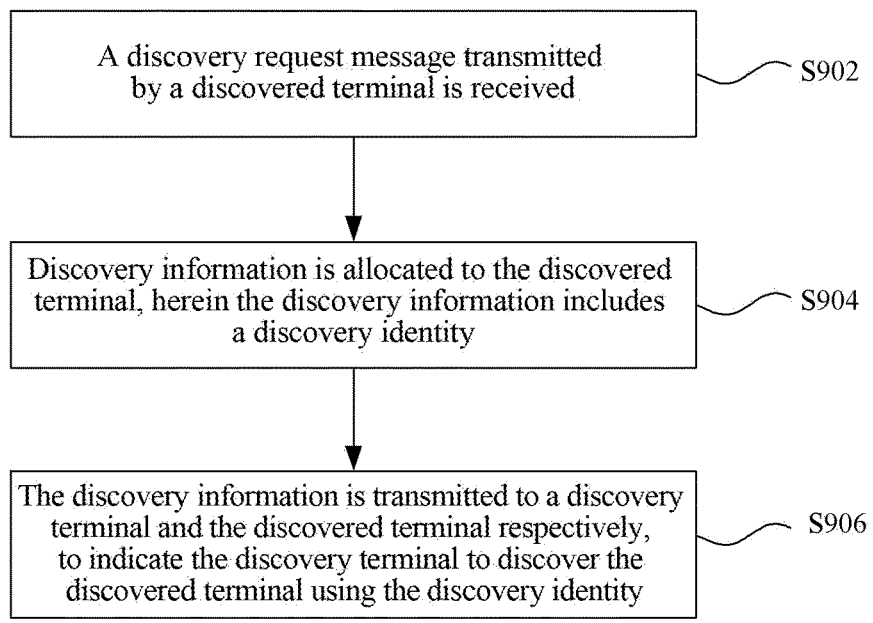
FIG. 9 is a flowchart of a near field communication discovery processing method according to an embodiment of the present disclosure.

FIG. 9 is a flowchart of a near field communication discovery processing method according to an embodiment of the present disclosure. As shown in FIG. 9, the method primarily includes steps S902-S906.

In step S902, a discovery request message transmitted by a discovered terminal is received.

In step S904, discovery information is allocated to the discovered terminal, herein the discovery information includes a discovery identity.

In step S906, the discovery information is transmitted to a discovery terminal and the discovered terminal respectively, to indicate the discovery terminal to discover the discovered terminal using the discovery identity.

In an alternative implementation of the present disclosure, before transmitting the discovery information to a discovery terminal and the discovered terminal respectively, the network side may further authenticate the discovered terminal and a friend list carried in the discovery request message, herein the friend list at least includes the discovery terminal; and then perform step S906 in a case of determining that the discovered terminal and the discovery terminal are located in the same position area.

Herein, the network side may transmit the discovery information to the discovered terminal through a discovery response message, and transmits the discovery information to the discovery terminal through a discovery identity update request.

In an alternative implementation according to an embodiment of the present disclosure, the discovery information may further include a validity period of the discovery identity.

In an alternative implementation according to an embodiment of the present disclosure, the discovery information may further include a service identity of the discovered terminal which indicates that the discovery terminal can discover the discovered terminal.

A specific implementation of the embodiments of the present disclosure will be described below by taking the system shown in FIG. 6 as an example. In FIG. 6, the network allocates a discovery code to a UE-B, issues it to a UE-A and the UE-B respectively, the UE-A performs paging or broadcasting using the discovery code, the UE-B makes a response to the UE-A after receiving the discovery code, and the UE-A discovers the UE-B.

Embodiment One

In the present embodiment, a PF-A allocates a discovery identity to a UE-B and notifies it to a UE-A and the UE-B, and the UE-A discovers the UE-B using the discovery identity.

Figure 10:
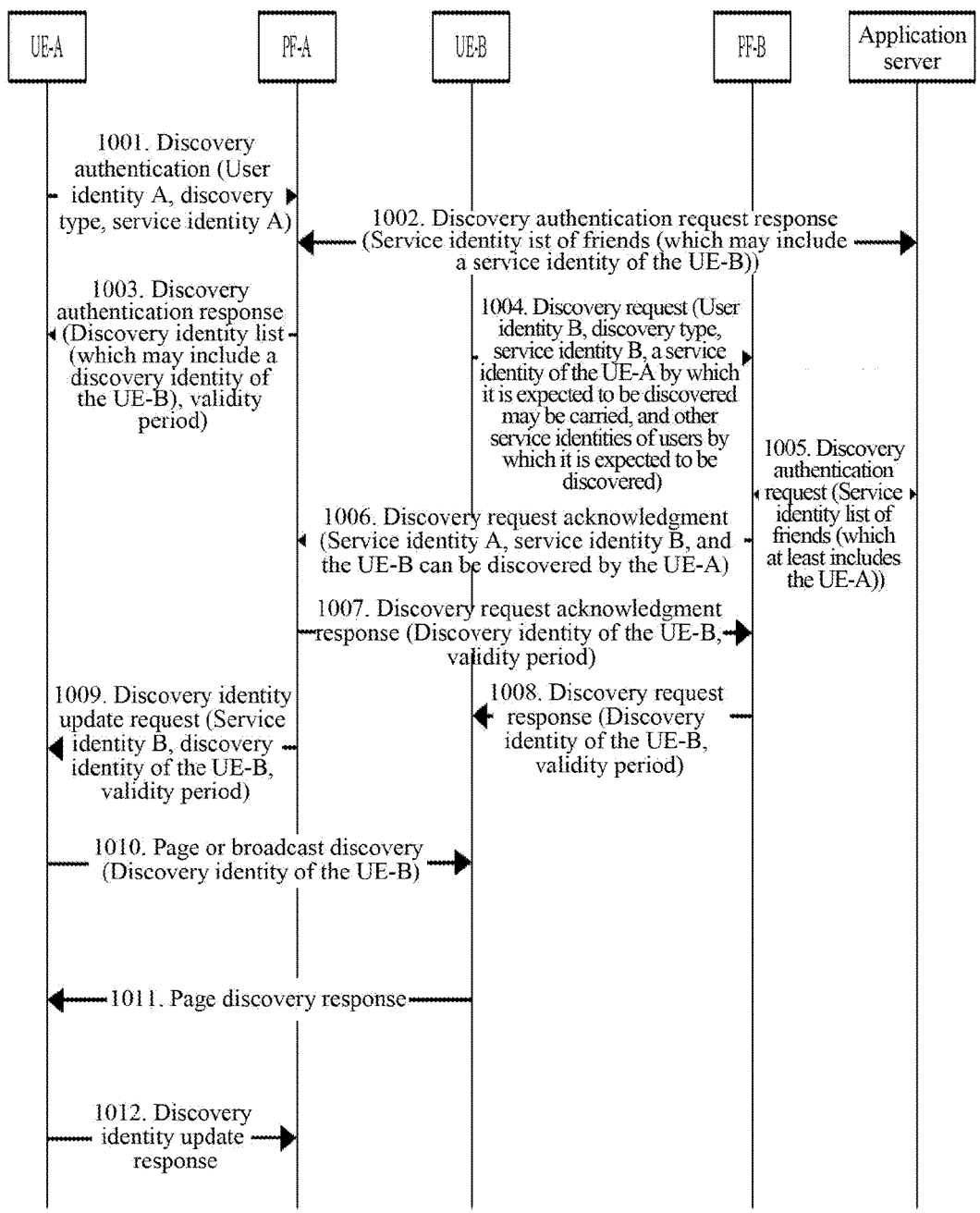
FIG. 10 is a first flowchart of a restrictive discovery method according to at least one embodiment of the present disclosure.

FIG. 10 is a signaling flowchart of a restrictive discovery service method in the embodiment one. As shown in FIG. 10, the method primarily includes the following steps.

In step 1001, the UE-A transmits a discovery authentication message to the PF-A to which it belongs. The message carries an identity of the UE-A, and carries a discovery type. In order to restrict the discovery, the message further carries a service identity of the UE-A during this discovery. The message further indicates discovery for seeking for a friend by the UE-A. The message further contains location information of the UE-A.

In step 1002, if the PF-A finds that there is no user context of the UE-A, the PF-A transmits an authentication request to a home register to acquire the user context of the UE-A. If there is a user context of the UE-A, the PF-A transmits a discovery authentication request message to an application server, which carries a service identity of the UE-A and location information of the UE-A. After the application server authenticates the UE-A, the application server transmits a discovery authentication response message back to the PF-A, which carries a friend list of the UE-A, i.e., a service identity list corresponding to friends of the UE-A.

In step 1003, the PF-A allocates a corresponding discovery identity table and a validity period corresponding to the discovery identity according to the service identity list corresponding to the friends of the UE-A, and the PF-A transmits a discovery authentication response message back to the UE-A, which carries the discovery identity table and the validity period corresponding to the discovery identity. The discovery identity is consisted of an operator identity corresponding to the PF-A, an identity of the PF-A, and temporary identities allocated by the PF-A to corresponding service identities.

As for the step 1002, the UE-A may directly perform authentication with the application layer on a service layer, the step 1002 occurs before step 1001, and in the step 1001, the service identities corresponding to its friends are further carried.

In step 1004, the UE-B transmits a discovery request message to the PF-B to which it belongs, which carries an identity of the UE-B, and carries a discovery type. In order to restrict the discovery, the message further carries a service identity of the UE-B during this discovery. The message further indicates that the UE-B is expected to be discovered by a friend. Therefore, the message may further carry friends or a friend list, by which it is expected to be discovered, i.e., a service identity list of the friends. The friends or the service identity list of the friends at least include(s) the service identity of the UE-A. The message further includes location information of the UE-B.

In step 1005, if the PF-B finds that there is no user context of the UE-B, the PF-B transmits an authentication request to the home register to acquire the user context of the UE-B. If there is a user context of the UE-B, the PF-B transmits a discovery authentication request message to the application server, which carries a service identity of the UE-B, or at the same time includes an identity which indicates that the UE-B can be discovered by the UE-A or other users. After the application server authenticates the UE-B and friends of the UE-B which can be discovered, the application server transmits a discovery authentication response message back to the PF-B, which carries a friend list of the UE-B after authenticating, i.e., a service identity list corresponding to friends which include at least the user UE-A, and the friends must be in the same location service area.

In step 1006, the PF-B transmits a discovery request acknowledgment message to a corresponding PF thereof (only the PF-A of the UE-A is described here) according to the service identities of the received friend list. The message carries the service identity of the UE-B, and at the same time further carries the service identity of the UE-A. The message indicates that the UE-B can be discovered by the UE-A.

Similarly, step 1005 may also be performed on the service layer, that is, the UE-B directly transmits an authentication request to the application server, and acquires a friend list of the UE-B. Then, a corresponding friend list is carried in step 1004.

In step 1007, the PF-A authenticates the UE-B and the UE-A, and if the PF-A has allocated a discovery identity to the UE-B, then no allocation is required, and if the PF-A does not allocate a discovery identity to the UE-B, a discovery identity and a corresponding validity period are allocated to the UE-B, and a discovery request acknowledgment response message is transmitted back to the PF-B, the message carries the discovery identity allocated by the PF-A to the UE-B and the validity period corresponding to the discovery identity.

In step 1008, the PF-B transmits a discovery request response message back to the UE-B, which carries the discovery identity allocated by the PF-A to the UE-B and the validity period corresponding to the discovery identity. Similarly, the message may further carry a discovery identity and a validity period allocated by a PF corresponding to another friend to the UE-B. The UE-B stores the corresponding discovery identities and validity periods, and allocates corresponding radio resources, to wait for being discovered by the UE-A and other friends.

In step 1009, the PF-A transmits a discovery identity update request to the UE-A, which carries the discovery identity of the UE-B and the validity period corresponding to the discovery identity. The message may further carry the service identity of the UE-B. The message indicates that the UE-A can discover the UE-B, i.e., the UE-B is on line and is near the UE-A at the same time.

In step 1010, the UE-A performs broadcasting or paging for discovering the UE-B within the validity period corresponding to the discovery identity of the UE-B, and the broadcast or page discovery message carries the discovery identity of the UE-B.

In step 1011, after the UE-B monitors the broadcast and page discovery, it transmits a page or broadcast response back to the UE-A, which identifies that the UE-A has discovered the UE-B, the broadcast is a unicast message from the UE-B to the UE-A.

In step 1012, the UE-A transmits a discovery identity update request response message back to the PF-A, which indicates that the UE-A has discovered the UE-B and the PF-A completes charging.

Embodiment Two

In the present embodiment, a PF-A allocates a discovery identity to a UE-B and notifies it to a UE-A and the UE-B, and the UE-A discovers the UE-B using the discovery identity.

Figure 11:
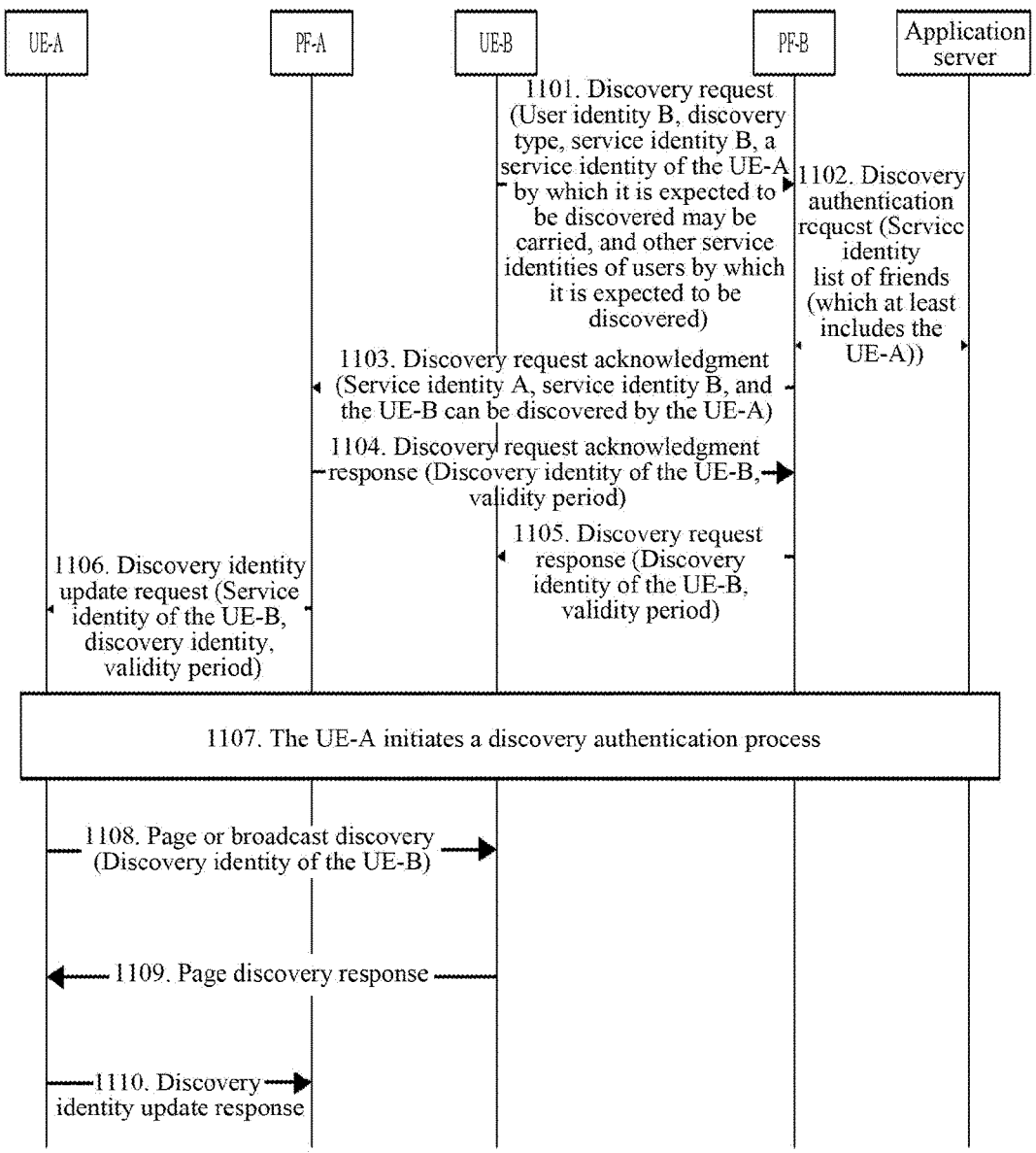
FIG. 11 is a second flowchart of a restrictive discovery method according to at least one embodiment of the present disclosure.

FIG. 11 is a signaling flowchart of a restrictive discovery service method in the embodiment one. As shown in FIG. 11, the method primarily includes the following steps.

In step 1101, the UE-B transmits a discovery request message to the PF-B to which it belongs, which carries an identity of the UE-B, and carries a discovery type. In order to restrict the discovery, the message further carries a service identity of the UE-B during this discovery. The message further indicates that the UE-B is expected to be discovered by a friend. Therefore, the message may further carry friends or a friend list, by which it is expected to be discovered, i.e., a service identity list of the friends. The friends or the service identity list of the friends at least include(s) the service identity of the UE-A. The message further includes location information of the UE-B.

In step 1102, if the PF-B finds that there is no user context of the UE-B, the PF-B transmits an authentication request to the home register to acquire the user context of the UE-B. If there is a user context of the UE-B, the PF-B transmits a discovery authentication request message to the application server, which carries a service identity of the UE-B, or at the same time includes an identity which indicates that the UE-B is expected to be discovered by the UE-A or other users. After the application server authenticates the UE-B and discovered friends of the UE-B, the application server transmits a discovery authentication response message back to the PF-B, which carries an authenticated friend list of the UE-B, i.e., a service identity list corresponding to friends which includes at least the user UE-A, and the friends must be in the same location service area.

In step 1103, the PF-B transmits a discovery request acknowledgment message to a corresponding PF thereof (only the PF-A of the UE-A is described here) according to the service identities of the received friend list. The message carries the service identity of the UE-B, and at the same time further carries the service identity of the UE-A. The message indicates that the UE-B is expected to be discovered by the UE-A. The message further includes location information of the UE-B.

Similarly, step 1102 may also be performed on the service layer, that is, the UE-B directly transmits an authentication request to the application server, and acquires a friend list of the UE-B. Then, a corresponding friend list is carried in step 1101.

In step 1104, the PF-A authenticates the UE-B and the UE-A, allocates a discovery identity and a corresponding validity period to the UE-B, and transmits a discovery request acknowledgment response message back to the PF-B, the message carries the discovery identity allocated by the PF-A to the UE-B and the validity period corresponding to the discovery identity. The discovery identity is consisted of an operator identity corresponding to the PF-A, an identity of the PF-A, and a temporary identity allocated by the PF-A to a corresponding service identity.

In step 1105, the PF-B transmits a discovery request response message back to the UE-B, which carries the discovery identity allocated by the PF-A to the UE-B and the validity period corresponding to the discovery identity. Similarly, the message may further carry a discovery identity and a validity period allocated by a PF corresponding to another friend to the UE-B. The UE-B stores the corresponding discovery identities and validity periods, and allocates corresponding radio resources, to wait for being discovered by the UE-A and other friends.

In step 1106, the PF-B transmits a discovery identity update request to the UE-A, which carries the discovery identity of the UE-B and the validity period corresponding to the discovery identity. The message may further carry the service identity of the UE-B and the location information corresponding to the UE-B. The message indicates that the UE-A can discover the UE-B.

In step 1107, alternatively, the UE-A performs a discovery authentication process for the PF-A and the application server. This process is similar to steps 1001-1003 in embodiment one.

In step 1108, the UE-A judges whether the UE-B is in an effective location area, and then performs broadcasting or paging for discovering the UE-B within the validity period corresponding to the discovery identity of the UE-B, the broadcast or page discovery message carries the discovery identity of the UE-B.

In step 1109, after the UE-B monitors the broadcast and page discovery, it transmits a page or broadcast response back to the UE-A, which identifies that the UE-A has discovered the UE-B, the broadcast is a unicast message from the UE-B to the UE-A.

In step 1110, the UE-A transmits a discovery identity update request response message back to the PF-A, which indicates that the UE-A has discovered the UE-B and the PF-A completes charging.

Embodiment Three

In the present embodiment, a PF-B allocates a discovery identity to a UE-B and notifies it to a UE-A and the UE-B, and the UE-A discovers the UE-B using the discovery identity.

Figure 12:
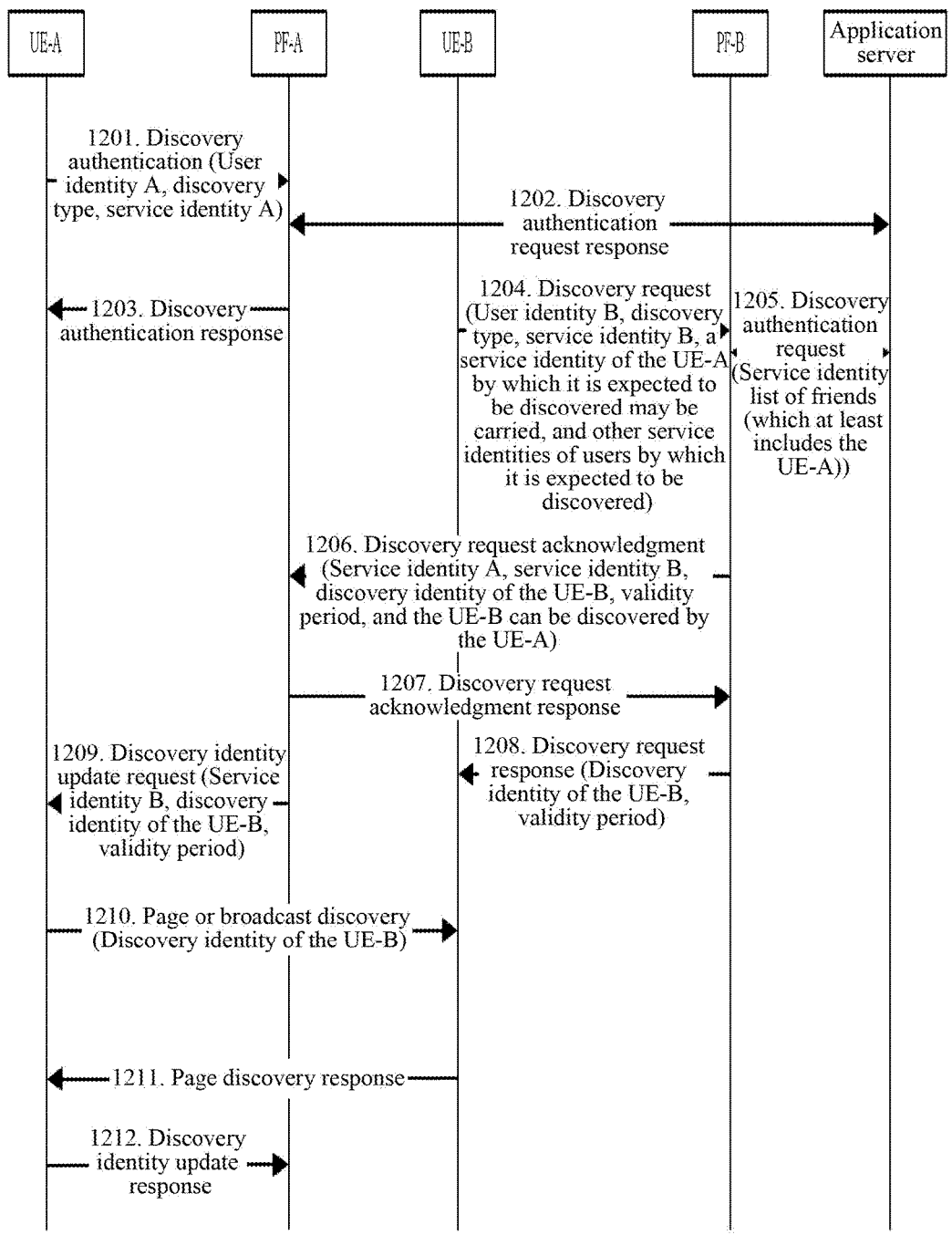
FIG. 12 is a third flowchart of a restrictive discovery method according to at least one embodiment of the present disclosure.

FIG. 12 is a signaling flowchart of a restrictive discovery service method in the present embodiment. As shown in FIG. 12, the method includes the following steps.

In step 1201, the UE-A transmits a discovery authentication message to the PF-A to which it belongs. The message carries an identity of the UE-A, and carries a discovery type. In order to restrict the discovery, the message further carries a service identity of the UE-A during this discovery. The message further indicates discovery for seeking for a friend by the UE-A. The message further contains location information of the UE-A.

In step 1202, if the PF-A finds that there is no user context of the UE-A, the PF-A transmits an authentication request to a home register to acquire the user context of the UE-A. If there is a user context of the UE-A, the PF-A transmits a discovery authentication request message to an application server, which carries a service identity of the UE-A and location information of the UE-A. After the application server authenticates the UE-A, the application server transmits a discovery authentication response message back to the PF-A, which carries a friend list of the UE-A, i.e., a service identity list corresponding to friends of the UE-A.

In step 1203, the PF-A transmits a discovery authentication response message back to the UE-A.

As for step 1202, the UE-A may directly perform authentication with the application layer on a service layer, the step 1202 occurs before step 1201, and in the step 1201, the service identities corresponding to its friends are further carried.

In step 1204, the UE-B transmits a discovery request message to the PF-B to which it belongs, which carries an identity of the UE-B, and carries a discovery type. In order to restrict the discovery, the message further carries a service identity during this discovery. The message further indicates that the UE-B is discovered by a friend. Therefore, the message may further carry friends or a friend list, by which it is expected to be discovered, i.e., a service identity list of the friends. The friends or the service identity list of the friends at least include(s) the service identity of the UE-A. The message further includes location information of the UE-B.

In step 1205, if the PF-B finds that there is no user context of the UE-B, the PF-B transmits an authentication request to the home register to acquire the user context of the UE-B. If there is a user context of the UE-B, the PF-B transmits a discovery authentication request message to the application server, which carries a service identity of the UE-B, or at the same time includes an identity which indicates that the UE-B is expected to be discovered by the UE-A or other users. After the application server authenticates the UE-B and discovered friends of the UE-B, the application server transmits a discovery authentication response message back to the PF-B, which carries an authenticated friend list of the UE-B, i.e., a service identity list corresponding to friends which includes at least the user UE-A, the friends must be in the same location service area.

In step 1206, the PF-B allocates a discovery identity to the UE-B, and a validity period corresponding to the discovery identity. The discovery identity is consisted of an operator identity corresponding to the PF-B, an identity of the PF-B, and a temporary identity allocated by the PF-B to a corresponding service identity. At the same time, the PF-B transmits a discovery request acknowledgment message to a corresponding PF thereof (only the PF-A of the UE-A is described here) according to the service identities of the received friend list. The message carries the service identity of the UE-B, and at the same time further carries the service identity of the UE-A. The message indicates that the UE-B is expected to be discovered by the UE-A. The message further carries the discovery identity allocated by the PF-B to the UE-B and the validity period corresponding to the discovery identity.

Similarly, step 1205 may also be performed on the service layer, that is, the UE-B directly transmits an authentication request to the application server, and acquires a friend list of the UE-B. Then, a corresponding friend list is carried in step 1204.

In step 1207, the PF-A authenticates the UE-B and the UE-A, and transmits a discovery request acknowledgment response message back to the PF-B.

In step 1208, the PF-B transmits a discovery request response message back to the UE-B, which carries the discovery identity allocated by the PF-B to the UE-B and the validity period corresponding to the discovery identity. The UE-B stores the corresponding discovery identities and validity periods, and allocates corresponding radio resources, to wait for being discovered by the UE-A and other friends.

In step 1209, the PF-A transmits a discovery identity update request to the UE-A, which carries the discovery identity of the UE-B and the validity period corresponding to the discovery identity. The message may further carry the service identity of the UE-B. The message indicates that the UE-A can discover the UE-B, i.e., the UE-B is on line and is near the UE-A at the same time.

In step 1210, the UE-A performs broadcasting or paging for discovering the UE-B within the validity period corresponding to the discovery identity of the UE-B, the broadcast or page discovery message carries the discovery identity of the UE-B.

In step 1211, after the UE-B monitors the broadcast and page discovery, it transmits a page or broadcast response back to the UE-A, which identifies that the UE-A has discovered the UE-B, the broadcast is a unicast message from the UE-B to the UE-A.

In step 1212, the UE-A transmits a discovery identity update request response message back to the PF-A, which indicates that the UE-B has discovered the UE-A and the PF-A completes charging.

Embodiment Four

In the present embodiment, a PF-B allocates a discovery identity to a UE-B and notifies it to a UE-A and the UE-B, and the UE-A discovers the UE-B using the discovery identity.

Figure 13:
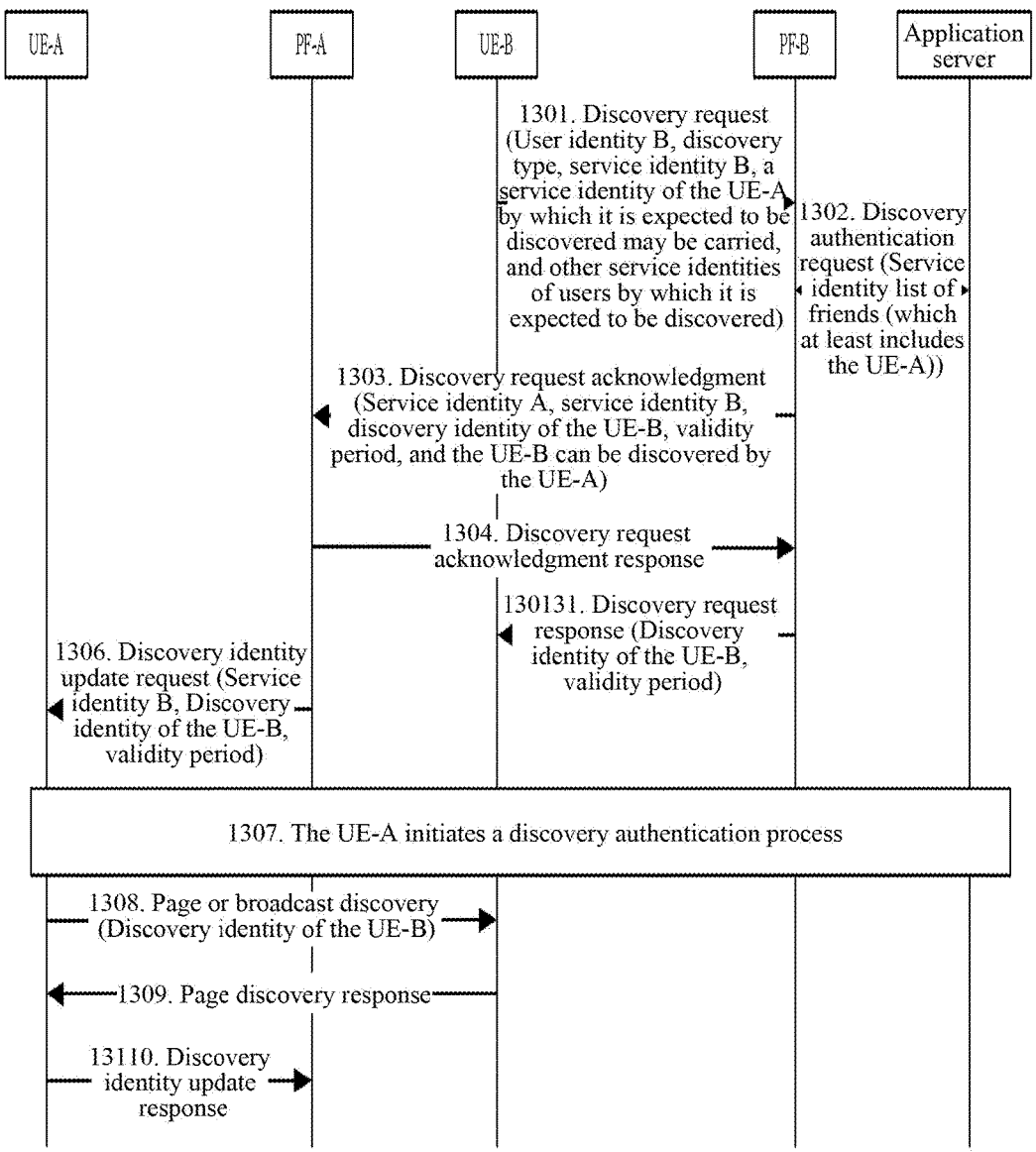
FIG. 13 is a fourth flowchart of a restrictive discovery method according to at least one embodiment of the present disclosure.

FIG. 13 is a signaling flowchart of a restrictive discovery service method in the embodiment one. As shown in FIG. 13, the method includes the following steps.

In step 1301, the UE-B transmits a discovery request message to the PF-B to which it belongs, which carries an identity of the UE-B, and carries a discovery type. In order to restrict the discovery, the message further carries a service identity during this discovery. The message further indicates that the UE-B is expected to be discovered by a friend. Therefore, the message may further carry friends or a friend list, by which it is expected to be discovered, i.e., a service identity list of the friends. The friends or the service identity list of the friends at least include(s) the service identity of the UE-A. The message further includes location information of the UE-B.

In step 1302, if the PF-B finds that there is no user context of the UE-B, the PF-B transmits an authentication request to the home register to acquire the user context of the UE-B. If there is a user context of the UE-B, the PF-B transmits a discovery authentication request message to the application server, which carries a service identity of the UE-B, or at the same time includes an identity which indicates that the UE-B is expected to be discovered by the UE-A or other users. After the application server authenticates the UE-B and discovered friends of the UE-B, the application server transmits a discovery authentication response message back to the PF-B, which carries an authenticated friend list of the UE-B, i.e., a service identity list corresponding to friends which includes at least the user UE-A, the friends must be in the same location service area.

In step 1303, the PF-B allocates a discovery identity to the UE-B, and a validity period corresponding to the discovery identity. The discovery identity is consisted of an operator identity corresponding to the PF-B, an identity of the PF-B, and a temporary identity allocated by the PF-B to a corresponding service identity. At the same time, the PF-B transmits a discovery request acknowledgment message to a corresponding PF thereof (only the PF-A of the UE-A is described here) according to the service identities of the received friend list. The message carries the service identity of the UE-B, and at the same time further carries the service identity of the UE-A. The message indicates that the UE-B is expected to be discovered by the UE-A. The message further carries the discovery identity allocated by the PF-B to the UE-B and the validity period corresponding to the discovery identity. The message further includes location information of the UE-B.

Similarly, step 1302 may also be performed on the service layer, that is, the UE-B directly transmits an authentication request to the application server, and acquires a friend list of the UE-B. Then, a corresponding friend list is carried in step 1301.

In step 1304, the PF-A authenticates the UE-B and the UE-A, and transmits a discovery request acknowledgment response message back to the PF-B.

In step 1305, the PF-B transmits a discovery request response message back to the UE-B, which carries the discovery identity allocated by the PF-B to the UE-B and the validity period corresponding to the discovery identity. The UE-B stores the corresponding discovery identities and validity periods, and allocates corresponding radio resources, to wait for being discovered by the UE-A and other friends.

In step 1306, the PF-A transmits a discovery identity update request to the UE-A, which carries the discovery identity of the UE-B and the validity period corresponding to the discovery identity. The message may further carry the service identity of the UE-B and the location information corresponding to the UE-B. The message indicates that the UE-A can discover the UE-B.

In step 1307, alternatively, the UE-A performs a discovery authentication process for the PF-A and the application server. This process is similar to steps 401-403 in embodiment one.

In step 1308, the UE-A judges whether the UE-B is in an effective location area, and then performs broadcasting or paging for discovering the UE-B within the validity period corresponding to the discovery identity of the UE-B, the broadcast or page discovery message carries the discovery identity of the UE-B.

In step 1309, after the UE-B monitors the broadcast and page discovery, it transmits a page or broadcast response back to the UE-A, which identifies that the UE-A has discovered the UE-B, the broadcast is a unicast message from the UE-B to the UE-A.

In step 1310, the UE-A transmits a discovery identity update request response message back to the PF-A, which indicates that the UE-B has discovered the UE-A and the PF-A completes charging.

Embodiment Five

In the present embodiment, an application server allocates a discovery identity to a UE-B and notifies it to a UE-A and the UE-B, and the UE-A discovers the UE-B using the discovery identity.

Figure 14:
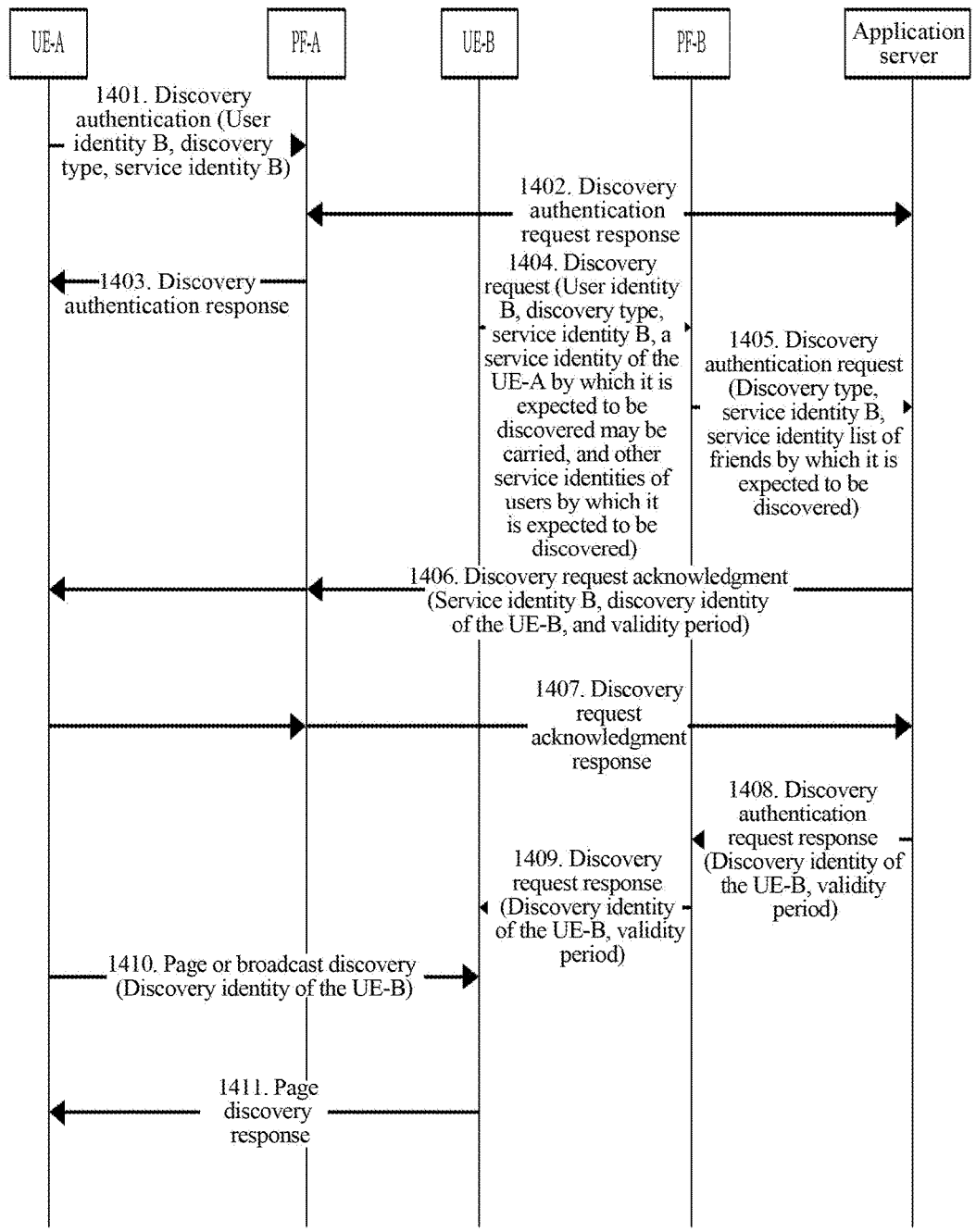
FIG. 14 is a fifth flowchart of a restrictive discovery method according to at least one embodiment of the present disclosure.

FIG. 14 is a signaling flowchart of a restrictive discovery service method in the present embodiment. As shown in FIG. 14, the method includes the following steps.

In step 1401, the UE-A transmits a discovery authentication message to the PF-A to which it belongs. The message carries an identity of the UE-A, and carries a discovery type. In order to restrict the discovery, the message further carries a service identity of the UE-A during this discovery. The message further indicates discovery for seeking for a friend by the UE-A. The message further contains location information of the UE-A.

In step 1402, if the PF-A finds that there is no user context of the UE-A, the PF-A transmits an authentication request to a home register to acquire the user context of the UE-A. If there is a user context of the UE-A, the PF-A transmits a discovery authentication request message to an application server, which carries a service identity of the UE-A and location information of the UE-A. After the application server authenticates the UE-A, the application server transmits a discovery authentication response message back to the PF-A, which carries a friend list of the UE-A, i.e., a service identity list corresponding to friends of the UE-A.

In step 1403, the PF-A transmits a discovery authentication response message back to the UE-A.

As for the step 1402, the UE-A may directly perform authentication with the application layer on a service layer, the step 1402 occurs before step 1401, and in the step 1401, the service identities corresponding to its friends are further carried.

In step 1404, the UE-B transmits a discovery request message to the PF-B to which it belongs, which carries an identity of the UE-B, and carries a discovery type. In order to restrict the discovery, the message further carries a service identity during this discovery. The message further indicates that the UE-B is expected to be discovered by a friend. Therefore, the message may further carry friends or a friend list, by which it is expected to be discovered, i.e., a service identity list of the friends. The friends or the service identity list of the friends at least include(s) the service identity of the UE-A. The message further includes location information of the UE-B.

In step 1405, if the PF-B finds that there is no user context of the UE-B, the PF-B transmits an authentication request to the home register to acquire the user context of the UE-B. If there is a user context of the UE-B, the PF-B transmits a discovery authentication request message to the application server, which carries a service identity of the UE-B, or at the same time includes an identity which indicates that the UE-B is expected to be discovered by the UE-A or other users. The message further carries a discovery service with a discovery type being restriction, and the message further includes location information of the UE-B.

In step 1406, the application server allocates a discovery identity and a validity period corresponding to the discovery identity to the UE-B. The discovery identity is consisted of an identity of the application server, and a temporary identity allocated by the application server to a service identity corresponding to the UE-B. The application server authenticates the UE-B and the corresponding friend list. The friend list of the UE-B at least includes the UE-A, and the UE-A and the UE-B are located in the same location area, i.e., the UE-B can discover the UE-A. Then, the application server transmits a discovery request authentication message to the UE-A through the PF-A according to the service identity of the UE-A, which carries the discovery identity, and the validity period corresponding to the discovery identity. The message may further carry the service identity of the UE-B.

In step 1407, the UE-A authenticates the service identity of the UE-B, and transmits a discovery request acknowledgement response message back to the application server.

In step 1408, the application server transmits a discovery authentication request response message back to the PF-B, which carries the discovery identity and the validity period corresponding to the discovery identity.

In step 1409, the PF-B transmits a discovery request response message back to the UE-B, which carries the discovery identity and the validity period corresponding to the discovery identity.

The steps 1406 and 1407 are performed in parallel with the steps 1408 and 1409.

In step 1410, the UE-A performs broadcasting or paging for discovering the UE-B within the validity period corresponding to the discovery identity of the UE-B, the broadcast or page discovery message carries the discovery identity of the UE-B.

In step 1411, after the UE-B monitors the broadcast and page discovery, it transmits a page or broadcast response back to the UE-A, which indicates that the UE-A has discovered the UE-B, the broadcast is a unicast message from the UE-B to the UE-A.

Similarly, if the steps 1401, 1402 and 1403 are not performed, the discovery request authentication of 1401-1403 is selectively performed after the step 1406.

It can be seen from the above description that the network side transmits the discovery identity of the discovered terminal to the discovery terminal and the discovered terminal respectively, and the discovery terminal performs discovery using the discovery identity allocated by the network side to the discovered terminal. This avoids the problem of a waste of radio resources due to occupation of air interface resources by the discovery terminal for broadcasting the discovery code, thereby saving the radio resources, which is advantageous for the development of the restrictive discovery service.

Obviously, those skilled in the art should understand that each module or each step of the aforementioned present disclosure can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; in some cases, the steps illustrated or described can be performed in an order different from that described here; alternatively, they are respectively made into various integrated circuit modules; and alternatively, it is implemented with making several modules or steps of them into a single integrated circuit module. Thus, the present disclosure is not limited to any specific combinations of hardware and software.

The above description is only the alternative embodiments of the present disclosure, and is not used to limit the present disclosure. For those skilled in the art, the present disclosure can have a variety of modifications and changes. Any change, equivalent replacement and improvement etc. made within the rule and the principle of the present disclosure should be contained within the protection scope of the present disclosure.

INDUSTRIAL APPLICABILITY

As described above, the near field communication discovery method, apparatus and system according to the embodiments of the present disclosure have the following beneficial effects. The discovery terminal performs discovery using the discovery identity allocated by the network side to the discovered terminal. This avoids the problem of a waste of radio resources due to occupation of air interface resources by the discovery terminal for broadcasting the discovery code, thereby saving the radio resources, which is advantageous for the development of the restrictive discovery service.

What is claimed is:

1. A restrictive discovery method for a Device to Device service, comprising:
   allocating, by a Proximity-based Services (ProSe) Function (PF) to which a discovered terminal belongs, discovery information comprising a discovery identity, to the discovered terminal;
   transmitting, by the PF to which the discovered terminal belongs, the discovery information comprising the discovery identity of the discovered terminal to a PF to which a discovery terminal belongs;
   transmitting, by the PF to which the discovered terminal belongs, the discovery information comprising the discovery identity of the discovered terminal to the discovered terminal;
   transmitting, by the PF to which the discovered terminal belongs, the discovery information comprising the discovery identity of the discovered terminal to the discovery terminal to indicate the discovery terminal to discover the discovered terminal using the discovery identity of the discovered terminal;
   performing, by the discovery terminal, paging or broadcasting using the discovery identity of the discovered terminal, wherein a page message or a broadcast message transmitted by the discovery terminal carries the discovery identity of the discovered terminal; and
   receiving, by the discovery terminal, a response returned by the discovered terminal in response to the page message or the broadcast message, and determining, by the discovery terminal, that the discovered terminal is discovered.

2. The method according to claim 1, wherein the discovery identity comprises the following information: an operator identity corresponding to the PF to which the discovered terminal belongs, an identity of the PF to which the discovered terminal belongs, and a temporary identity allocated by the PF to which the discovered terminal belongs to a service identity of the discovered terminal.

3. The method according to claim 1, wherein the discovery information further comprises a validity period of the discovery identity,
   or,
   wherein the discovery information further comprises a service identity of the discovered terminal, which indicates that the discovery terminal can discover the discovered terminal.

4. A restrictive discovery method for a Device to Device service, comprising:
   allocating, by a Proximity-based Services (ProSe) Function (PF) to which a discovered terminal belongs, discovery information comprising a discovery identity, to the discovered terminal;
   transmitting, by the PF to which the discovered terminal belongs, the discovery information comprising the discovery identity of the discovered terminal to a PF to which a discovery terminal belongs;
   transmitting, by the PF to which the discovered terminal belongs, the discovery information comprising the discovery identity of the discovered terminal to the discovered terminal;
   transmitting, by the PF to which the discovered terminal belongs, the discovery information comprising the discovery identity of the discovered terminal to the discovery terminal to indicate the discovery terminal to discover the discovered terminal using the discovery identity of the discovered terminal;
   performing, by the discovery terminal, paging or broadcasting using the discovery identity of the discovered terminal, wherein a page message or a broadcast message transmitted by the discovery terminal carries the discovery identity of the discovered terminal;
   receiving, by the discovered terminal, the page message or the broadcast message transmitted by the discovery terminal; and
   determining, by the discovered terminal, that the discovery identity carried in the page message or the broadcast message is the same as the discovery identity received from the PF to which the discovered terminal belongs, and returning a page or broadcast response message to the discovery terminal to indicate that the discovery terminal discovers the discovered terminal.

5. The method according to claim 4,
   wherein the discovery identity comprises the following information: an operator identity corresponding to the PF to which the discovered terminal belongs, an identity of the PF to which the discovered terminal belongs, and a temporary identity allocated by the PF to which the discovered terminal belongs to a service identity of the discovered terminal.

6. The method according to claim 4, wherein the discovery information further comprises a validity period of the discovery identity, or, wherein the discovery information further comprises a service identity of the discovered terminal, which indicates that the discovery terminal can discover the discovered terminal.

7. A restrictive discovery processing method for a Device to Device service, comprising:

receiving, by a Proximity-based Services (ProSe) Function (PF) to which a discovered terminal belongs, a discovery request message transmitted by the discovered terminal;

allocating, by the PF to which the discovered terminal belongs, discovery information comprising a discovery identity to the discovered terminal;

transmitting, by the PF to which the discovered terminal belongs, the discovery information comprising the discovery identity of the discovered terminal to a PF to which a discovery terminal belongs;

transmitting, by the PF to which the discovered terminal belongs, the discovery information comprising the discovery identity of the discovered terminal to the discovered terminal; and transmitting, by the PF to which the discovery terminal belongs, the discovery information comprising the discovery identity of the discovered terminal to the discovery terminal, to indicate the discovery terminal to discover the discovered terminal using the discovery identity of the discovered terminal.

8. The method according to claim 7, wherein before transmitting the discovery information to the discovery terminal and the discovered terminal, the method further comprises:

authenticating the discovered terminal and a friend list carried in the discovery request message, wherein the friend list at least comprises the discovery terminal; and determining that the discovered terminal and the discovery terminal are located in a same location area.

9. The method according to claim 7, wherein the discovery information further comprises a validity period of the discovery identity, or, wherein the discovery information further comprises a service identity of the discovered terminal which indicates that the discovery terminal can discover the discovered terminal.

10. A restrictive discovery apparatus for a Device to Device service, the apparatus being comprised in a discovery terminal and comprising:

a first reception module, arranged to receive discovery information comprising a discovery identity of a discovered terminal from a Proximity-based Services (ProSe) Function (PF) to which the discovery terminal belongs, wherein the discovery information comprising the discovery identity is allocated by a PF to which the discovered terminal belongs to the discovered terminal, the discovery information comprising the discovery identity of the discovered terminal is transmitted by the PF to which the discovered terminal belongs to the PF to which the discovery terminal belongs, and the discovery information comprising the discovery identity of the discovered terminal is transmitted by the PF to which the discovered terminal belongs to the discovered terminal, and the PF to which the discovery terminal belongs transmits the discovery information comprising the discovery identity of the discovered terminal to the discovery terminal to indicate the discovery terminal to discover the discovered terminal using the discovery identity of the discovered terminal;

a discovery module, arranged to perform paging or broadcasting using the discovery identity of the discovered terminal, wherein a page message or a broadcast message transmitted by the discovery terminal carries the discovery identity of the discovered terminal; and a second reception module arranged to receive a response returned by the discovered terminal in response to the page message or the broadcast message, and determine that the discovered terminal is discovered.

11. A restrictive discovery apparatus for a Device to Device service, the apparatus being comprised in a discovered terminal and comprising:

a first reception module arranged to receive discovery information comprising a discovery identity allocated to the discovered terminal from a Proximity-based Services (ProSe) Function (PF) to which the discovered terminal belongs, wherein the discovery information comprising the discovery identity is allocated by the PF to which the discovered terminal belongs to the discovered terminal, the discovery information comprising the discovery identity of the discovered terminal is transmitted by the PF to which the discovered terminal belongs to a PF to which a discovery terminal belongs, and the discovery information comprising the discovery identity of the discovered terminal is transmitted by the PF to which the discovery terminal belongs to the discovery terminal to indicate the discovery terminal to discover the discovered terminal using the discovery identity of the discovered terminal;

a second reception module arranged to receive a page message or a broadcast message transmitted by the discovery terminal when the discovery terminal performs paging or broadcasting using the discovery identity of the discovered terminal, wherein the page message or the broadcast message carries the discovery identity of the discovered terminal;

a determination module arranged to determine that the discovery identity carried in the page message or the broadcast message is the same as the discovery identity received from the PF to which the discovered terminal belongs; and a transmission module arranged to return a page or broadcast response message to the discovery terminal to indicate that the discovery terminal discovers the discovered terminal.

12. A restrictive discovery processing apparatus for a Device to Device service, the apparatus being comprised in a network side and comprising a Proximity-based Services (ProSe) Function (PF) to which a discovered terminal belongs, and a PF to which a discovery terminal belongs, wherein:

the PF to which the discovered terminal belongs is arranged to receive a discovery request message transmitted by the discovered terminal;

the PF to which the discovered terminal belongs is arranged to allocate discovery information comprising a discovery identity to the discovered terminal;

the PF to which the discovered terminal belongs is arranged to transmit the discovery information comprising the discovery identity of the discovered terminal to the PF to which the discovery terminal belongs;

the PF to which the discovered terminal belongs is arranged to transmit the discovery information comprising the discovery identity of the discovered terminal to the discovered terminal; and the PF to which the discovery terminal belongs is arranged to transmit the discovery information comprising the discovery identity of the discovered terminal to the discovery terminal, to indicate the discovery terminal to discover the discovered terminal using the discovery identity of the discovered terminal.

13. The apparatus according to claim 12, further comprising:

an authentication module, arranged to authenticate the discovered terminal and a friend list carried in the discovery request message, wherein the friend list at least comprises the discovery terminal; and a determination module arranged to determine that the discovered terminal and the discovery terminal are located in a same location area.

14. A near field communication discovery system, comprising:

a network side comprising the apparatus according to claim 12;

a discovery terminal, comprising a restrictive discovery apparatus for a Device to Device service, comprising: a first reception module, arranged to receive discovery information comprising a discovery identity of a discovered terminal from a Proximity-based Services (ProSe) Function (PF) to which the discovery terminal belongs, wherein the discovery information comprising the discovery identity is allocated by a PF to which the discovered terminal belongs to the discovered terminal, the discovery information comprising the discovery identity of the discovered terminal is transmitted by the PF to which the discovered terminal belongs to the PF to which the discovery terminal belongs, and the discovery information comprising the discovery identity of the discovered terminal is transmitted by the PF to which the discovered terminal belongs to the discovered terminal, and the PF to which the discovery terminal belongs transmits the discovery information comprising the discovery identity of the discovered terminal to the discovery terminal to indicate the discovery terminal to discover the discovered terminal using the discovery identity of the discovered terminal; a discovery module, arranged to perform paging or broadcasting using the discovery identity of the discovered terminal, wherein a page message or a broadcast message transmitted by the discovery terminal carries the discovery identity of the discovered terminal; and a second reception module arranged to receive a response returned by the discovered terminal in response to the page message or the broadcast message, and determine that the discovered terminal is discovered; and a discovered terminal, comprising a restrictive discovery apparatus for the Device to Device service, comprising: a first reception module arranged to receive discovery information comprising a discovery identity allocated to the discovered terminal from a PF to which the discovered terminal belongs, wherein the discovery information comprising the discovery identity is allocated by the PF to which the discovered terminal belongs to the discovered terminal, the discovery information comprising the discovery identity of the discovered terminal is transmitted by the PF to which the discovered terminal belongs to a PF to which a discovery terminal belongs, and the discovery information comprising the discovery identity of the discovered terminal is transmitted by the PF to which the discovery terminal belongs to the discovery terminal to indicate the discovery terminal to discover the discovered terminal using the discovery identity of the discovered terminal; a second reception module arranged to receive a page message or a broadcast message transmitted by the discovery terminal when the discovery terminal performs paging or broadcasting using the discovery identity of the discovered terminal, wherein the page message or the broadcast message carries the discovery identity of the discovered terminal; a determination module arranged to determine that the discovery identity carried in the page message or the broadcast message is the same as the discovery identity received from the PF to which the discovered terminal belongs; and a transmission module arranged to return a page or broadcast response message to the discovery terminal to indicate that the discovery terminal discovers the discovered terminal.

* * * * *